May 21, 1946. W. A. EATON 2,400,688
FLUID PRESSURE CONTROL SYSTEM
Filed Sept. 15, 1944
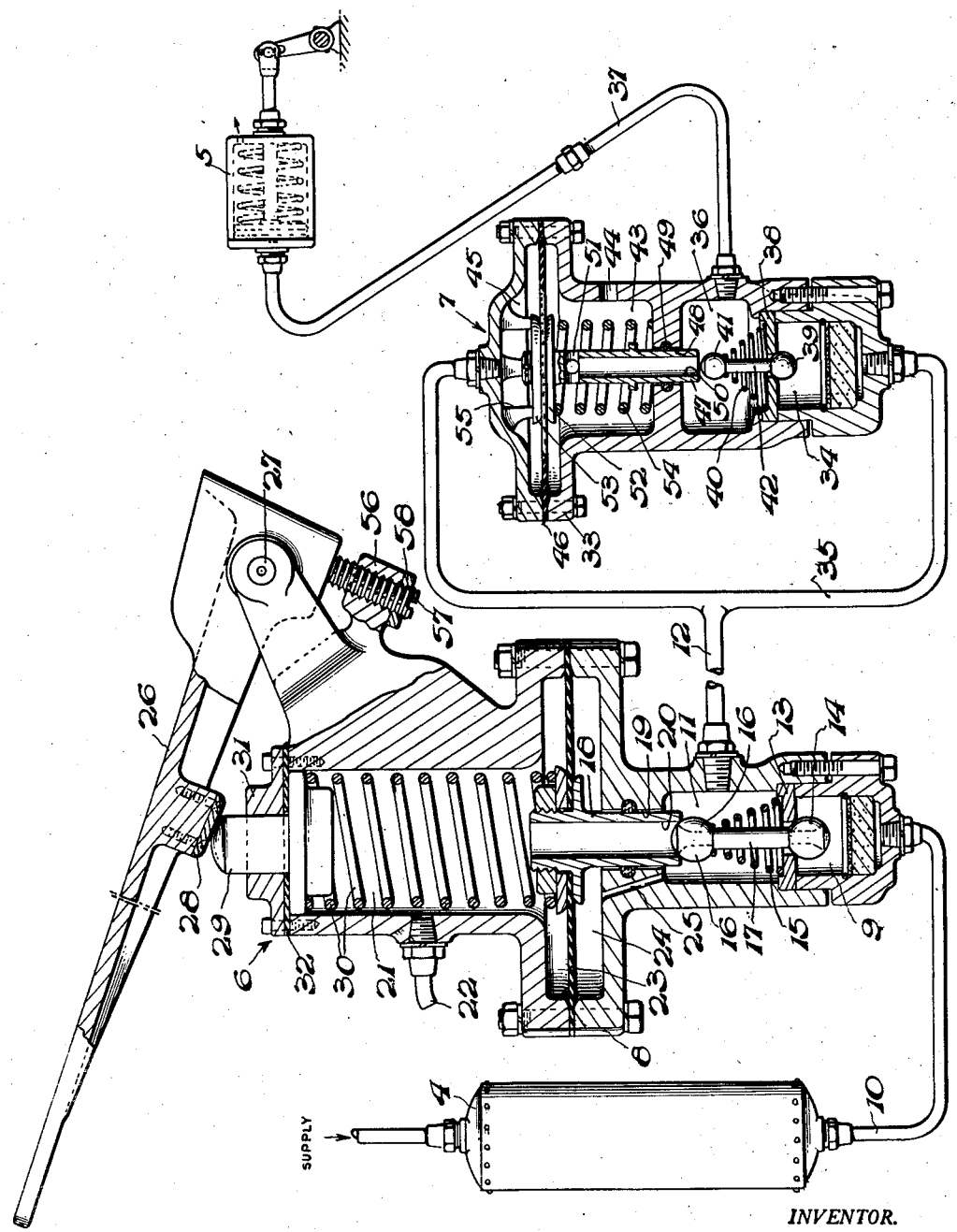
INVENTOR.
Wilfred A. Eaton
BY
Scrivener & Parker
ATTORNEYS Patented May 21, 1946

2,400,688

UNITED STATES PATENT OFFICE 2,400,688

FLUID PRESSURE CONTROL SYSTEM

Wilfred A. Eaton, Elyria, Ohio, assignor to Bendix-Westinghouse Automotive Air Brake Company, Elyria, Ohio, a corporation of Delaware Application September 15, 1944, Serial No. 554,277

9 Claims. (Cl. 303—48)

This invention relates to fluid pressure control mechanism, and more particularly to valve mechanism for controlling the supply of fluid pressure from a reservoir to an actuator.

It has previously been customary in connection with the operation of fluid pressure actuators, and particularly in connection with the operation of fluid pressure actuators for brakes, to utilize a control valve of the so-called self-lapping type to control the flow of fluid pressure from the reservoir to the actuator, but many of the valves previously used for this purpose have been so constructed as to unnecessarily delay the flow of fluid pressure to the actuator, and is accordingly an object of the present invention to provide control valve means so constituted as to overcome these difficulties.

Self-lapping valves of the type previously used have been usually provided with inlet and exhaust valves, and due to the fact that the exhaust valve is normally in open position when the brakes are released, it is necessary for the operator to move the brake valve operating pedal sufficiently to close the exhaust valve before the inlet valve can be opened to supply fluid pressure to the actuator, and it is a further object of the present invention to provide means for eliminating this unnecessary pedal travel in order to provide for an immediate supply of fluid pressure to the actuator on depression of the brake pedal.

Yet another object of the invention is to provide, in connection with control valve mechanism of the above type, means for adjusting the position of brake pedal whereby the exhaust valve of the brake valve is normally maintained in closed position.

A still further object of the invention is to provide, in connection with valve mechanism of the above type, means for insuring a complete release of fluid pressure from the actuator when the brake pedal is in released position.

In many brake systems of the above type, the actuator is remotely positioned from the brake valve, and is connected thereto with a relatively long conduit having an appreciable volume, and it has been necessary for the brake valve to supply sufficient fluid pressure to fill the conduit before fluid pressure could be supplied to the actuator, resulting in a delay in the application of fluid pressure to the actuator, and it is accordingly a further object of the invention to provide means for maintaining a portion of this conduit at a predetermined positive pressure.

Yet another object of the invention is to provide, in connection with a self-lapping brake valve of the above type, auxiliary control valve means positioned adjacent to the actuator for insuring a more rapid application of fluid pressure to the actuator on operation to the brake valve.

These and other novel features and objects of the invention will be more fully understood when considered in connection with the drawing and the accompanying description, but it is to be expressly understood that the invention is not limited to the form shown, but may readily be embodied in other forms, as will be understood by those skilled in the art. Reference will, therefore, be had to the appended claims for a definition of the limits of the invention.

In the drawing wherein one embodiment of the invention is shown, there is illustrated a rudimentary fluid pressure brake system including, in general, a reservoir 4, a fluid pressure actuator 5 for operating the brakes, a self-lapping operator controlled valve mechanism 6 for controlling the pressure of fluid in the actuator, and auxiliary valve mechanism 7 interposed in the connection between the self-lapping control valve and the actuator for further controlling the supply of fluid pressure to the actuator, as will be more fully described hereinafter.

The self-lapping control valve mechanism 6 is constructed in accordance with the principles set forth in the patent to William J. Andres and Roy S. Sanford, No. 2,133,275, dated October 18, 1938, a casing 8 being provided with an inlet chamber 9 connected with the reservoir 4 by means of a conduit 10 and provided with an outlet chamber 11 having an outlet conduit 12. The chambers 9 and 11 are separated by means of a ported partition 13, and communication between the two chambers through the partition is normally prevented by means of a valve spring 15 interposed between the upper surface of the partition and the lower surface of an exhaust valve 16 carried on the upper end of a valve stem 17 connected with the inlet valve. A valve operating element 18 is slidably mounted in a bore 19 formed in the casing, the center of the element being provided with a bore 20 adapted to communicate at its lower end with the outlet chamber and at its upper end with a chamber 21 formed in the casing and connected with atmosphere by means of an exhaust conduit 22. A pressure responsive diaphragm 23, clamped in the casing as shown and connected at its center to the valve operating element, serves to close the lower end of the atmospheric chamber 21 and to form, in connection with the casing, a diaphragm chamber 24, this chamber being connected with the outlet chamber through a restricted passage 25. In order that the valve operating element may be controlled by the vehicle operator, a brake pedal 26, pivotally mounted on the casing by means of a pivot pin 27 is provided, and a hardened plate 28 carried by the pedal is connected with the valve operating element by means of a plunger 29 slidably mounted in the upper portion of the housing and a graduating spring 30 interposed between the plunger and the upper side of the diaphragm.

Upward movement of the plunger is prevented by means of a collar 31 formed at the upper end of the housing as shown, and the position of the plunger may be adjusted, if desired, by means of a shim 32 interposed between the collar and the upper end of the casing. In the event it is desired to vary the normal position of the plunger relative to the cover, shims of various thicknesses may be substituted for the shim shown. For reasons which will be more fully explained hereinafter, the normal position of the plunger is preferably so adjusted as to slightly compress the graduating spring, the result being that when the reservoir is at atmospheric pressure, the diaphragm and valve operating element will be moved downward to close the exhaust valve and open the inlet valve, thus permitting communication between the inlet and outlet chambers. As the pressure in the reservoir builds up due to the operation of the compressor, not shown, this pressure will be transmitted to the outlet chamber through the ported partition and thence to the chamber below the diaphragm through the restricted passage 25, and when the force exerted by this pressure on the diaphragm in an upward direction has increased sufficiently to overcome the compression of the graduating spring, the diaphragm and valve operating element will move to the position shown, thus permitting closing of the inlet valve under the action of the inlet valve spring. Thereafter, as is characteristic of this type of self-lapping valve, the pressure in the outlet chamber and in the diaphragm chamber will be maintained in accordance with the degree of compression of the graduating spring. Therefore, the brake valve is so adjusted that the pressure in the outlet chamber and in the conduit 12 is normally maintained at a value equal to or slightly less than that of the pressure normally used to effect a very slight brake application.

In view of the fact that the conduit 12 is maintained at all times at a pressure above atmospheric pressure, it is necessary to provide additional means for controlling the flow of fluid pressure from this conduit to the actuator 5, and as heretofore stated, the valve mechanism 7 is employed for this purpose. The valve mechanism 7 includes a casing 33 having an inlet chamber 34 connected with the conduit 12 by means of a conduit 35, and an outlet chamber 36 connected with an actuator 5 by means of a relatively short conduit 37. It is also pointed out that if desired, the valve mechanism 7 may be mounted directly on the end of the actuator, in which case a port in the outlet chamber is connected directly with the interior of the actuator. A ported partition 38 serves to separate chambers 34 and 36, communication between the inlet and outlet chambers being normally prevented by means of an inlet valve 39 normally maintained in closed position by means of an inlet valve spring 40 interposed between the upper surface of the partition and the lower surface of an exhaust valve 41 connected with the inlet valve by means of a stem 42. The upper end of the casing is provided with an exhaust chamber 43 having an exhaust port 44, and a control chamber 45, communication between these chambers being prevented by means of a flexible diaphragm 46 suitably clamped in the casing as shown. A valve operating element 47 is slidably mounted in a bore 48 as shown, the bore being provided with a seal 49 for preventing leakage between the chambers 36 and 43 around the valve operating element. The valve operating element is provided with a bore 50, the lower end of this bore communicating with the outlet chamber 36, and the upper end of the bore communicating with the exhaust chamber through ports 51. The diaphragm 46 is clamped at its center to the valve operating element between a flange 52 formed on the upper end of the element and a nut 53 threadedly received by the upper end of the element. The valve operating element and diaphragm are normally maintained in the position shown by means of a spring 54 interposed between the casing and the lower surface of the shoulder 52, and stops 55 are so positioned on the casing with respect to the nut 53, as to maintain the lower end of the valve operating element spaced from the upper surface of the exhaust valve as shown, thus normally permitting communication between the actuator 5 and atmosphere through the conduit 37, the outlet chamber 36, the bore 50, ports 51, exhaust chamber 43 and exhaust port 44. Since the outlet chamber of the brake valve 6 is normally maintained at a pressure above atmospheric pressure, the inlet chamber 34 of the valve mechanism 7 is likewise maintained at this pressure through the connections heretofore described. In order that the valve mechanism 7 may be controlled by the operation of the brake valve 6, the upper end of the conduit 35 is connected to the control chamber 45, and this latter chamber is therefore subjected at all times to the pressure obtained in the outlet chamber 11 of the brake valve. The compression of the spring 54 is therefore so adjusted as to normally maintain the valve operating element 47 of the valve 7 in the position shown when the pedal of the brake valve is in released position, and is further so adjusted that a very slight increase in pressure in the fluid supplied to the control chamber 45 will serve to move the diaphragm 46 and the attached valve operating element downward to close the exhaust valve 41 in order to prevent communication between the actuator and the atmosphere through the passages described, and will thereafter open the inlet valve 39 to permit communication between the inlet and outlet chambers. Since the lower surface of the diaphragm is at all times subjected to atmospheric pressure, it will be understood that for all pressures above that for which the spring 54 is adjusted, the inlet valve 39 will be maintained in open position and the actuator 5 will be in communication with the outlet chamber 11 of the brake valve 6 through the conduit 37, outlet chamber 36, ported partition 38, inlet chamber 34, conduit 35 and conduit 12. When the brake valve is operated to reduce the pressure in the chamber 45 to a value below that for which the spring 54 is adjusted, the valve operating element 47 will again be moved to the position shown, closing the inlet valve 39 and opening the exhaust valve 41 to connect the actuator 5 with atmosphere, thus insuring a complete exhaust of fluid pressure from the actuator whenever the pedal of the brake valve is in release position. It may also be desirable to provide additional means for adjusting the pressure delivered by the brake valve 6 when the control valve is in released position, and to this end, a bracket portion 56 formed on the casing of the brake valve is adapted to threadedly receive an adjusting screw 57, the upper end of which contacts the lower surface of the brake pedal to the right of the pivot pin 27, upward movement of the adjusting screw thus serving to move the pedal to further compress the graduating spring 30 in order to increase the normal output pressure of the brake valve 6 with the control pedal in release position. A lock nut 58 is provided on the adjusting screw in order to insure maintenance of this adjustment, and it will be understood that this adjusting means may take the place of the shim 32 previously described.

As heretofore stated, the control valve mechanism 7 is preferably positioned adjacent the actuator 5, and in most cases will be remotely positioned from the brake valve 6, and connected thereto through the conduit 35 and a relatively long conduit 12. The mechanism illustrated and described in the present invention, therefore, provides means for maintaining the relatively long conduit 12, and the chambers 34 and 45, the conduit 35 and the chamber 11, at a pressure above atmospheric pressure at all times, and when it is desired to effect a brake application, it is only necessary to fill the volume represented by the chamber 36 and the conduit 37 in order to supply fluid pressure immediately to the actuator. Thus a distinct decrease in the transmission time of the fluid pressure from the brake valve to the actuator is effected during brake applications at pressures slightly above that which the brake valve is set, and in the event applications at higher pressures are required, these are affected in the conventional manner after the initial application has been effected. At the same time, the construction of the control valve mechanism is such that the exhaust valve 16 of the brake valve is normally closed at all times, with the result that the brake pedal movement necessary to effect opening of the inlet valve 14 in order to increase the pressure in the outlet chamber of the brake valve is extremely small. The present invention therefore provides means for eliminating that portion of the brake valve pedal travel which was formerly required to close the exhaust valve, thus resulting in a more rapid application of fluid pressure to the actuator than was previously possible.

It will be readily apparent from the foregoing description that means have been provided for maintaining a positive pressure of fluid in the conduit leading from the brake valve to the actuator, and that in addition to this, means have been provided for eliminating unnecessary travel of the brake pedal for the purpose of insuring more rapid application of fluid pressure to the actuator. At the same time, the valve 7 is so constructed as to insure a complete exhaust of fluid pressure from the actuator when the brake valve is in released position. The pressure required for a minimum brake application in a system of this type is normally on the order of eight or ten pounds, and a large percentage of brake applications made do not exceed fifteen or twenty pounds, although the apparatus is so constructed as to permit applications of 70 or 80 pounds to be made if desired. In view of this situation, the graduating spring of the brake valve is adjusted to maintain a pressure in the outlet chamber and in the conduit 12 which is slightly less than that of the normal minimum brake application, and the spring 54 of the valve 7 is correspondingly adjusted to maintain the exhaust valve 41 in open position at the pressure delivered by the brake valve with the control pedal in released position. In view of the relatively small area of the diaphragm 46 in relation to the area of valve operating element 47 which is subjected to the pressure of the outlet chamber 36, a slight increase in pressure in the control chamber 45 will be sufficient to close the exhaust valve 41 and fully open the inlet valve 39 in order to permit uninterrupted communication between the outlet chamber 11 of the brake valve and the actuator through the connections shown.

While one embodiment of the invention has been shown and described herein with considerable particularity, it is to be understood that the invention is not limited thereto, but is capable of a variety of expressions, as will now be readily apparent to those skilled in the art. Reference will, therefore, be had to the appended claims for a definition of the limits of the invention.

What is claimed is:

1. Control mechanism for a fluid actuator including self-lapping valve mechanism of the type having a movable control member, an outlet chamber, and means operable with the member in release position to maintain a predetermined pressure in the outlet chamber and operable on movement of the member from said position to increase said pressure in accordance with the degree of movement of said member, a connection between said outlet chamber and actuator, a normally closed valve in said connection, and means responsive to the pressure in said outlet chamber for opening said valve and for maintaining said valve in open position whenever said member is operated to increase the pressure in said outlet chamber above said predetermined value.

2. Control mechanism for a fluid actuator including self-lapping valve mechanism of the type having a movable control member, an outlet chamber, and means operable with the member in release position to maintain a predetermined pressure in the outlet chamber and operable on movement of the member from said position to increase said pressure in accordance with the degree of movement of said member, a connection between said outlet chamber and actuator, a normally closed valve associated with said connection for preventing the flow of fluid pressure from the outlet chamber to the actuator, a normally open valve for exhausting fluid pressure from the actuator, and means responsive to the pressure in the outlet chamber for closing the second named valve and opening the first named valve and maintaining said valve in open position when said member is operated to increase the pressure in said outlet chamber.

3. Control mechanism for a fluid actuator including self-lapping valve mechanism of the type having a movable control member, an outlet chamber, and means operable with the member in release position to maintain a predetermined pressure in the outlet chamber and operable on movement of the member from said position to increase said pressure in accordance with the degree of movement of said member, a connection between said outlet chamber and actuator, a normally closed valve associated with said connection for preventing the flow of fluid pressure from the outlet chamber to the actuator, a normally open valve for exhausting fluid pressure from the actuator, and means responsive to the pressure in said outlet chamber for sequentially closing the second named valve and opening the first named valve to maintain the latter in open position when the pressure in said outlet chamber exceeds said predetermined value.

4. Control mechanism for a fluid actuator including self-lapping valve mechanism of the type having a movable control member, an outlet chamber, and means operable with the member in release position to maintain a predetermined pressure in the outlet chamber and operable on movement of the member from said position to increase said pressure in accordance with the degree of movement of said member, a connection between said outlet chamber and actuator, and valvular means associated with said connection and controlled in response to variations of pressure in said outlet chamber for normally exhausting fluid pressure from the actuator and preventing the flow of fluid pressure from the outlet chamber to the actuator and operable whenever the pressure in the outlet chamber is increased above said predetermined value to permit the flow of fluid pressure from the outlet chamber to the actuator and to prevent the exhaust of fluid pressure from said actuator through said valvular means.

5. Control mechanism for a fluid actuator including self-lapping valve mechanism of the type having a movable control member, a fluid pressure chamber, and means operable with the member in release position for maintaining a predetermined pressure in said chamber and operable on movement of the member from release position to change the pressure in said chamber in accordance with the degree of movement of said member, a connection between said chamber and actuator, and valvular means associated with said connection and controlled in response to variations of pressure in said chamber for normally preventing communication between said chamber and actuator through said connection and operable to establish and maintain communication between said chamber and actuator whenever the pressure in said chamber is changed from said predetermined value in response to operation of said member.

6. Control mechanism for a fluid actuator including self-lapping valve mechanism having inlet and exhaust valves and an outlet chamber, means for operating said valves including an element responsive to the pressure in said outlet chamber, a movable member for operating said element having a release position, and resilient means for connecting said element and member, means for adjusting said release position of said member whereby with the member in release position the valves are maintained in closed position and a predetermined pressure is maintained in said outlet chamber and whereby on movement of the member from release position the pressure in said chamber is increased substantially in accordance with the degree of movement of the member, a connection between said outlet chamber and actuator, a valve for normally closing said connection, and means responsive to the pressure in the outlet chamber for opening said last named valve and for maintaining the latter in open position whenever the pressure in said outlet chamber exceeds said predetermined value.

7. Control mechanism for a fluid actuator including self-lapping valve mechanism having inlet and exhaust valves and an outlet chamber, means for operating said valves including an element responsive to the pressure in said outlet chamber, a movable member for operating said element having a release position, and resilient means for connecting said element and member, means for adjusting said release position of said member whereby with the member in release position the valves are maintained in closed position and a predetermined pressure is maintained in said outlet chamber and whereby on movement of the member from release position the pressure in said chamber is increased substantially in accordance with the degree of movement of the member, a connection between said outlet chamber and actuator, a valve for normally closing said connection, a normally open valve for exhausting fluid pressure from the actuator, and means responsive to the pressure in said chamber for closing the normally open valve and opening the normally closed valve and for maintaining said relationship whenever the pressure in said chamber exceeds said predetermined value.

8. Valvular means for controlling the supply of fluid pressure to an actuator including valve mechanism of the type having an outlet chamber, inlet and exhaust valves for controlling the flow of fluid pressure to and from said chamber, means including an element responsive to the pressure in said outlet chamber for operating said valves, means including a control member for operating said element having a release position, and means for adjusting said release position of said member whereby said valves are normally in closed position and whereby said inlet valve is moved to open position on initial movement of said member from release position, a connection between said outlet chamber and actuator, and control valve mechanism associated with said connection and positioned adjacent the actuator having valves for normally preventing the flow of fluid pressure from the outlet chamber to the actuator through said connection and for exhausting fluid pressure from the actuator, and means responsive to the pressure in said outlet chamber for operating said last named valves to connect said outlet chamber and actuator and to prevent the exhaust of fluid pressure from the actuator and to maintain said relationship when said inlet valve is opened to admit fluid pressure to the outlet chamber on movement of said control member from release position.

9. Valvular means for controlling the supply of fluid pressure to an actuator including valve mechanism of the type having an outlet chamber, inlet and exhaust valves for controlling the flow of fluid pressure to and from said chamber, means including an element responsive to the pressure in the outlet chamber for operating said valves, a control member for operating said element having a release position, a resilient connection between said member and element, and means for adjusting the tension of said resilient connection whereby with said member in release position a predetermined pressure is maintained in said outlet chamber and said inlet and exhaust valves are both maintained in closed position, a connection between said outlet chamber and actuator, and control valve mechanism associated with said connection and positioned adjacent said actuator having valves for normally preventing the flow of fluid pressure from the outlet chamber to the actuator through said connection and for exhausting fluid pressure from the actuator, and means responsive to the pressure in said outlet chamber for operating the last named valves to permit the flow of fluid pressure from the outlet chamber to the actuator and to prevent the exhaust of fluid pressure from the actuator whenever the pressure in said outlet chamber is greater than said predetermined pressure.

WILFRED A. EATON.